United States Patent
Le Boudec et al.

(10) Patent No.: US 10,078,318 B2
(45) Date of Patent: Sep. 18, 2018

(54) COMPOSABLE METHOD FOR EXPLICIT POWER FLOW CONTROL IN ELECTRICAL GRIDS

(71) Applicant: Ecole Polytechnique Fédérale de Lausanne (EPFL), Lausanne (CH)

(72) Inventors: Jean-Yves Le Boudec, Prilly (CH); Andrey Bernstein, Saint-Sulpice (CH); Mario Paolone, La Conversion (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 274 days.

(21) Appl. No.: 14/909,994

(22) PCT Filed: Aug. 26, 2013

(86) PCT No.: PCT/IB2013/056892
§ 371 (c)(1),
(2) Date: Feb. 4, 2016

(87) PCT Pub. No.: WO2015/028840
PCT Pub. Date: Mar. 5, 2015

(65) Prior Publication Data
US 2016/0179077 A1    Jun. 23, 2016

(51) Int. Cl.
*H04L 12/24* (2006.01)
*G05B 19/10* (2006.01)
(Continued)

(52) U.S. Cl.
CPC .............. *G05B 19/106* (2013.01); *H02J 3/38* (2013.01); *H02J 4/00* (2013.01); *H04L 41/046* (2013.01);
(Continued)

(58) Field of Classification Search
CPC . G05B 19/106; G05B 2219/2639; H02J 4/00; H02J 3/38; H02J 2003/007;
(Continued)

(56) References Cited

U.S. PATENT DOCUMENTS

| | | | |
|---|---|---|---|
| 7,840,312 B2 * | 11/2010 | Altemark | F03D 7/043 290/44 |
| 2010/0025994 A1 * | 2/2010 | Cardinal | F03D 7/0284 290/44 |
| 2013/0190938 A1 * | 7/2013 | Zadeh | H02J 13/0013 700/291 |

OTHER PUBLICATIONS

H.N. Aung, Agent-based intelligent control for real-time operation of a microgrid, Feb. 14, 2011, published in IEEE; [retrieved on May 24, 2018]. Retrieved from internet: <URL: https://ieeexplore.ieee.org/document/5712495/> (Year: 2011).*

(Continued)

*Primary Examiner* — Robert E Fennema
*Assistant Examiner* — Marzia T Monty
(74) *Attorney, Agent, or Firm* — Andre Roland S.A.; Nikolaus Schibli (57) ABSTRACT

A power flow control system for an interconnected power system, the interconnected power system comprising a plurality of electrical subsystems; an abstract framework configured to work as a utility maximizer under constraints (that applies to the electrical subsystems by specifying their capabilities, expected behavior and a simplified view of their internal state); and a plurality of agents. Each agent is responsible of one or a plurality of the electrical subsystems, comprises means configured to express an internal state of the electrical subsystem within a common system of coordinates, and has communication means configured to communicate among agents according to a protocol. The abstract framework means enables a composition of a set of the interconnected electrical subsystems into a further subsys- (Continued)

tem for which a further internal state is expressed within the same common system of coordinates used before, the further internal state being communicated with other agents according to the protocol.

5 Claims, 3 Drawing Sheets

(51) Int. Cl.
 *H02J 3/38* (2006.01)
 *H02J 4/00* (2006.01)
 *H02J 3/00* (2006.01)

(52) U.S. Cl.
 CPC . *G05B 2219/2639* (2013.01); *H02J 2003/003* (2013.01); *H02J 2003/007* (2013.01); *Y02E 60/76* (2013.01); *Y04S 10/54* (2013.01); *Y04S 40/22* (2013.01)

(58) Field of Classification Search
 CPC .. H02J 2003/003; H04L 41/046; Y02E 60/76; Y04S 10/54; Y04S 40/22
 USPC .......................................................... 700/295
 See application file for complete search history.

(56) References Cited

OTHER PUBLICATIONS

Colson et al., Comprehensive Real-Time Microgrid Power Management and Control with Distributed Agents, IEEE Transactions on Smart Grid, vol. 4, No. 1, Mar. 2013.
Craig G. Rieger et al., Resilient Control Systems—A Multi-Agent Dynamic Systems Perspective, IEEE International Conference on Electro/Information Technology (EIT), pp. 1-16, May 2013.
Ananthi et al., Reactive Power Optimization based on PSO and Considering Voltage Security in a Practical Power System, Emerging Trends in Science, Engineering and Technology (INCOSET) Dec. 2012, pp. 493-499.
Anderson, D. F., and Kurtz T.G., "Continuous time Markov chain models for chemical reaction networks" Design and Analysis of Biomolecular Circuits: Engineering Approaches to Systems and Synthetic Biology (2011): 3-42.
Arrillaga J., Bradley D., and Bodger P., Power system harmonics, J. Wiley and Sons, NY, 1985.
Basu A., Bozga M., and Sifakis J., "Modeling heterogeneous real-time components in BIP", Proc. of the 4th IEEE International Conference on. Software Engineering and Formal Methods, SEFM 2006.
Benaim M., and Le Boudec J.-Y., "A class of mean field interaction models for computer and communication systems". Performance Evaluation 65.11, 2008, pp. 823-838.
Borghetti A., Nucci C.A., Paolone M., Ciappi G., Solari A., "Synchronized Phasors Monitoring During the Islanding Maneuver of an Active Distribution Network", IEEE Trans. on Smart Grid, vol. 2 , issue: 1, Mar. 2011, pp. 82-91.
Christakou K., Le Boudec J.-Y, Paolone M., and Tomozei D.C., "Efficient Computation of Sensitivity Coefficients of Node Voltages and Line Currents in Unbalanced Radial Electrical Distribution Networks", IEEE Trans. on Smart Grid, to appear, 2013.
Christakou K., Tomozei D.-C., Le Boudec J.-Y., and Paolone M., "GECN: Primary Voltage Control for Active Distribution Networks via Real-Time Demand-Response", in press on IEEE Trans. on Smart Grids, 2014.
Christian Rehtanz, Power Systems: Autonomous Systems and Intelligent Agents in Power System Control and Operation, Springer Verlag, Berlin, Germany, 2003, ISBN 978-3-540-40202-2, (Abstract).
Davie B., Charny A., Bennet J. C. R., Benson K., Le Boudec J. Y., Courtney, W., Stiliadis, D. "An expedited forwarding PHB (per-hop behavior)", Internet RFC 3246, 2002.

European Network of Transmission System Operators for Electricity (ENTSO-E), Draft Network Code on Demand Connection, Dec. 5, 2012.
European Network of Transmission System Operators for Electricity (ENTSO-E), UCTE Operation Handbook, v. 2.5, Jun. 2004.
Galiana F. D., Almeida K., Toussaint M., Griffin J., and Atanackovic D., "Assessment and control of the impact of FACTS devices on power system performance", IEEE Trans. on Power Systems, vol. 11, No. 4, Nov. 1996, pp. 1931-1936.
Gast, N., Gaujal B., and Le Boudec J-Y., "Mean field for Markov decision processes: from discrete to continuous optimization", IEEE Trans. on Automatic Control, vol. 57, issue: 9, Sep. 2012, pp. 2266-2280.
Gerbex S., Cherkaoui R., and Germond A.J., "Optimal Location of Multi-Type FACTS Devices in a Power System by Means of Genetic Algorithms", IEEE Trans. on Power Systems, vol. 16, issue: 3, Aug. 2001, pp. 537-544.
Gordon S., "Supergrid to the rescue," Power Engineer, vol. 20, No. 5, pp. 30-33, Oct.-Nov. 2006.
Gotham D. J. and Heydt G. T., "Power flow control and power flow studies for systems with FACTS devices", IEEE Trans. on Power Systems, vol. 13, issue: 1, Feb. 1998, pp. 60-65.
Griffin J., Atanackovic D., and Galiana F. D., "A study of the impact of FACTS on the secure-economic operation of power systems," Proc. of the 12th Power Systems Computation Conference, Dresden, Aug. 1996, pp. 537-544.
Hatziargyriou, N. et al., CIGRE WG Network of the Future, "Electricity Supply Systems of the Future", Electra, vol. 256, Jun. 2011, pp. 42-49.
IEA, World Energy Outlook, 2004.
IEC 61588, Precision Time Protocol (PTP), version 2, International Electrotechnical Commission, Geneva, 2008, Preview with table of contents.
IEEE Std 1547.2, IEEE Application Guide for IEEE Std 1547, IEEE Standard for Interconnecting Distributed Resources with Electric Power Systems, 2008.
International Search Report (ISR) of PCT/IB2013/056892 dated May 19, 2014.
Jenkins et al., Embedded Generation, IEE Power, PBPO0310, Energy Engineering, Jul. 2000 (Abstract).
Keshav, S., and Rosenberg C., "Direct adaptive control of electricity demand", Technical Report CS-2010-17, University of Waterloo, 2010.
Larsen, K. G., Pettersson P., and Wang Yi. "UPPAAL in a Nutshell,", International Journal on Software Tools for Technology Transfer (STTT) 1.1,1997, pp. 134-152.
Le Boudec J.-Y., and Thiran P., Network calculus: a theory of deterministic queuing systems for the Internet, vol. 2050, Springer, 2001.
Le Boudec J.-Y., and Tomozei D.-C. "A demand-response calculus with perfect batteries." Measurement, Modelling, and Evaluation of Computing Systems and Dependability and Fault Tolerance, 2012, pp. 273-287.
MacKay D., Sustainable Energy-without the hot air, UIT Cambridge, 2008.
Neely M.J., Tehrani A.S., and Dimakis A.G. "Efficient Algorithms for Renewable Energy Allocation to DelayTolerant Consumers", Proc. of the 1st IEEE International Conference on Smart Grid Communications (SmartGrid-Comm), 2010, pp. 549-554.
Northcote-Green et al., "Control and automation of electrical power distribution systems," Boca Raton; London: CRC/Taylor & Francis, 2007, (Introduction).
Palomar D. P., and Mung Chiang. "A tutorial on decomposition methods for network utility maximization", IEEE Journal on Selected Areas in Communications, vol. 24, issue: 8, 2006, pp. 1439-1451.
Papadogiannis K.A., and Hatziargyriou N.D., "Optimal allocation of primary reserve services in energy markets", IEEE Trans. on Power Systems, vol. 19, issue: 1, 2004 , pp. 652-659.
Raman, S. and McCanne, S., "Model, analysis, and protocol framework for soft state-based communication", ACM SIGCOMM Computer Communication Review, vol. 29, 1999, pp. 15-25.

(56) References Cited

OTHER PUBLICATIONS

Singh N., Kliokys E., Feldmann H., Kiissel R., Chrustowski R., and Jaborowicz C., "Power System Modelling and Analysis in a Mixed Energy Management and Distribution Management System", IEEE Trans. on Power Systems., vol. 13, issue: 3, Aug. 1998, pp. 143-1149.
Thiele L., Chakraborty S., and Naedele M., "Real-time calculus for scheduling hard real-time systems", Proc. of the 2000 IEEE International Symposium on Circuits and Systems, ISCAS, Geneva, Switzerland, vol. 4., pp. 101-104.
Troy N., Flynn D., OMalley M., "Multi-Mode Operation of Combined-Cycle Gas Turbines With Increasing Wind Penetration", IEEE Trans. on Power Systems, vol. 27, issue: 1, Feb. 2012, pp. 484-492.
Van Herten D. and Ghandhari M., "Multi-terminal VSC HVDC for the European Supergrid: Obstacles," Renewable and Sustainable Energy Reviews, vol. 14, No. 9, 2010, pp. 3156-3163.
Woodcock J., Larsen P.G., Bicarregui J., Fitzgerald J., "Formal methods: Practice and experience", ACM Computing Surveys (CSUR), vol. 41.4, 2009, pp. 19-1, 19-36.
Wooldridge M. and Jennings N. "Intelligent agents: theory and practice", The Knowledge Engineering Review, vol. 10, pp. 115-152, 1995.
Xie, L., Dae-Hyun Choi, Kar, S., Poor. H.V., "Fully Distributed State Estimation for Wide-Area Monitoring Systems", IEEE Trans. on Smart Grids, vol. 3. issue: 3, Sep. 2012, pp. 1154-1169.
Zhao, C., Topcu, U. and Low, S. H.. "Fast load control with stochastic frequency measurement", California Institute of Technology, Pasadena, USA, 2011.

\* cited by examiner

Prior art

COMPOSABLE METHOD FOR EXPLICIT POWER FLOW CONTROL IN ELECTRICAL GRIDS

The present application is a U.S. national stage application of PCT/IB2013/056892 filed on Aug. 26, 2013, the contents of which is herewith incorporated in its entirety.

TECHNICAL FIELD

The present invention is in the field of electrical power networks and the control thereof.

STATE OF THE ART AND OBJECTIVES

Modern and future infrastructures, such as electrical and transportation systems, have to satisfy the following main conflicting requirements: provide reliable and secure services to an increasing number of customers, taking into account a rational use of energy and the protection of the environment. This last requirement drives major changes in power systems, where the most evident result is a quadratic increase of the connection of renewable energy sources. It is generally admitted that renewable energy sources need to be massive and distributed, in order to provide a significant part of the consumed electrical energy [MacKay 2008].

The increased penetration of distributed renewable energy-resources in electrical medium and low-voltage networks is such that, in several countries, operational constraints are already attained. This calls for a radical re-engineering of this part of the electrical infrastructure. One of the main obstacles to a full deployment of renewables is the lack of direct controllability by distribution networks operators of the distributed energy sources and the infrastructure around them. Classic approaches are unable to scale to such an increase in complexity. There is therefore a general consensus that the integration of renewable energy sources into the existing power distribution grids stands on the achievement of the successful combination of smart processes (e.g., demand side/response management, real-time consumption management, real-time local energy balance) and new technologies (e.g. smart meters, agent-based distributed controls). This will eventually make possible both energy efficiency improvements and the advanced operation of the power distribution/transmission networks.

The system and method of the present invention rely on a new approach for controlling electrical networks.

SUMMARY OF INVENTION

In a first aspect the invention provides a powerflow control system for an interconnected power system. The interconnected power system comprises: a plurality of electrical subsystems; an abstract framework configured to work as a utility maximiser under constraints (that applies to the electrical subsystems by specifying their capabilities, expected behavior and a simplified view of their internal state); and a plurality of agents. Each agent is responsible of one or a plurality of the electrical subsystems, comprises means configured to express an internal state of the electrical subsystem within a common system of coordinates, and has communication means configured to communicate among agents according to a protocol. The abstract framework means enables a composition of a set of the interconnected electrical subsystems into a further subsystem for which a further internal state is expressed within the same common system of coordinates used before, the further internal state being communicated with other agents according to the protocol.

In a preferred embodiment each one of the electrical subsystems comprises one or more of the following: a power system; a load; a generator or a storage device.

In a further preferred embodiment at least one agent among the plurality of agents is a software agent configured to speak for, and control a set of selected electrical subsystems.

In a further preferred embodiment at least one agent among the plurality of agents is associated with a device.

In a further preferred embodiment at least one agent among the plurality of agents is associated with an electrical subsystem that includes a number of devices comprising at least a power system.

In a further preferred embodiment at least one agent among the plurality of agents is implemented as one of the following: a stand-alone processor; a process on a control computer; an embedded system.

In a second aspect the invention provides a method for an explicit powerflow control in an interconnected power system. The method comprises steps of defining a plurality of agents, whereby each agent is an entity capable of autonomous action on an associated electrical subsystem in order to meet a determined design objective; and defining an abstract framework that applies to electrical subsystems in order to specify their internal state and their expected behavior in a common system of coordinates. The defining of the abstract framework comprises using for each subsystem an associated agent associated to the subsystem, for representing the abstract framework as an envelope of a set of trajectories of each electrical subsystem in the system of coordinates composed by a active-reactive powers and time (PQt) profile together with a set of virtual costs and belief functions; and using for each electrical subsystem the associated agent for communicating an internal state and expected behavior of the electrical subsystem by using a protocol. The PQt profile describes bounds for active power (P), and reactive power (Q) that an electrical subsystem can inject or absorb over a time horizon $\Delta t$ starting from time $t_0$. Virtual costs contain information about how close the electrical subsystem is to its operational constraints, and are expressed as a function of both active and reactive power. Belief functions contain bounds for active power (P), and reactive powers (Q) that an electrical subsystem can inject or absorb when instructed to operate at a given active and reactive power setpoint. More in particular, belief functions express the uncertainty about the electrical subsystem and are used to guarantee that the interconnected power systems, or a subset of it (i.e., a further subsystem) is always in a safe region of operation.

In a preferred embodiment of the inventive method each agent makes decisions based on the information advertised to it without having to know all internal details of the electrical subsystems it interacts with.

In a further preferred embodiment of the inventive method each agent solves one or several steps of an optimization problem that minimizes an objective function composed by a measure of the quality of electrical service and the sum of the virtual costs advertised by the agents, subject to constraints expressed by the belief functions, thus ensuring that the electrical system is always in a safe state In a further preferred embodiment of the inventive method a group of electrical subsystems is aggregated and viewed by other electrical systems as a single entity using an abstract framework specific to the group.

In yet a further preferred embodiment of the inventive method the interconnected power system comprises electrical subsystems that each either are an alternative current (AC), or a direct current (DC) electrical systems.

In yet a further preferred embodiment the objective function is given by the following problem:

minimise $$W(y(P_1,Q_1,\ldots,P_3)(Q_3))+C_1(P_1,Q_1)+C_2(P_2,Q_2)+C_3(P_3,Q_3)$$

over $$(P_1,Q_1,P_2,Q_2,P_3,Q_3) \in R$$

wherein, $P_1$, $Q_1$ are the active and reactive powers at a node b1 in the interconnected power system, $C_1(P_1, Q_1)$ is the virtual cost advertised by agent 1, and similarly with indices 2 and 3, y is the state of the grid, W is a penalty function, which maps the estimated state to a measure of the quality of service of the grid controlled by the agent, and the set R is the set of admissible setpoints derived from the belief functions. A setpoint $(P_1, Q_1, P_2, Q_2, P_3, Q_3)$ is said admissible if any $(P'_1, Q'_1, P'_2, Q'_2, P'_3, Q'_3)$ is such that $(P'_1, Q'_1) \in BF_1(P_1, Q_1)$, $(P'_2, Q'_2)$ § $BF_2(P_2, Q_2)$ and $(P'_3, Q'_3)$ § $BF_3(P_3, Q_3)$ leads to only safe electrical states of the grid. Here $BF_1(P_1, Q_1)$ is the set of possible actual active and reactive powers that the first electrical system can inject or absorb when it receives the setpoints $(P_1, Q_1)$, and similarly with indices 2 and 3.

BRIEF DESCRIPTION OF THE FIGURES

The invention will be better understood in view of the description of example embodiments and in reference to the appended drawings, wherein FIG. 1 schematically illustrates a typical frequency control scheme of an interconnected power system from prior art.

DESCRIPTION OF EXAMPLE EMBODIMENTS

In the following paragraphs, we describe the fundamental limitations of the current control approaches for electrical systems.

Limitations of the Current Control Methods for Electrical Systems

The main controls of an interconnected power system are essentially concerned with (i) maintaining the energy balance inside the interconnected network and (ii) maintaining the voltage levels close to the rated values. These two basic controls are the building-blocks used by other more sophisticated regulators responsible for hierarchically superior actions (e.g. stability assessment, congestions in main transmission corridors, etc.).

Power Balance—

Figure 1:
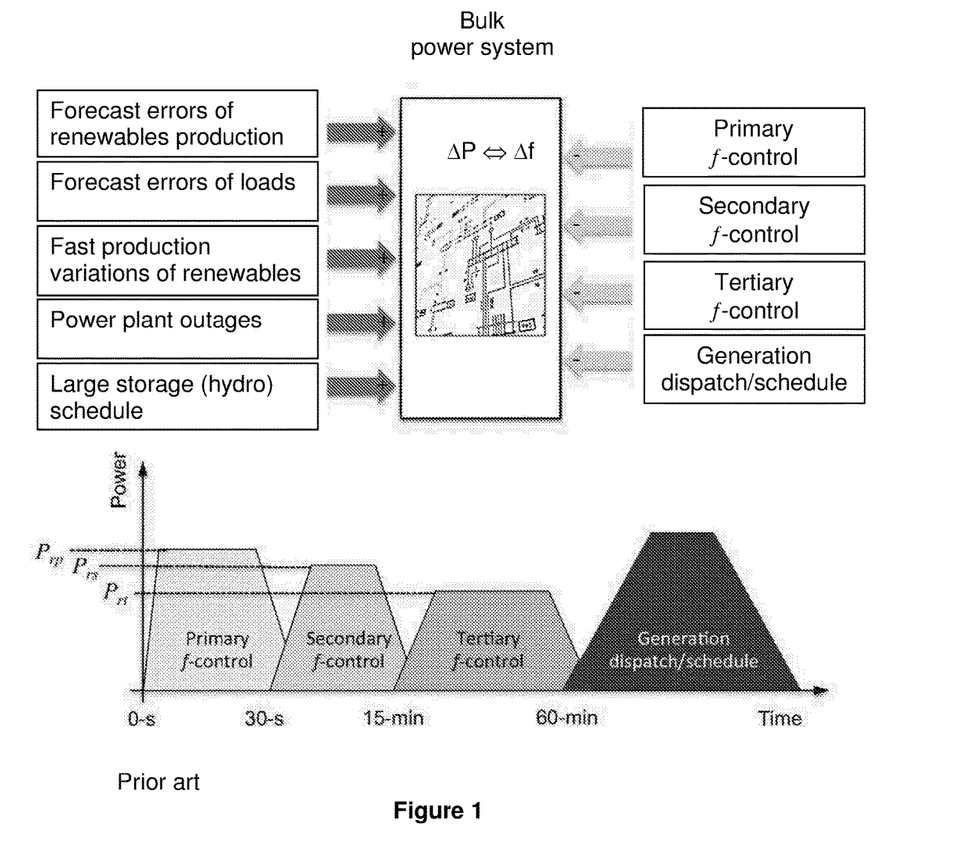

The relevant scheme is represented in FIG. 1. As can be observed, it is based on the link between the power imbalance and the network frequency (that constitutes the control variable). It is composed of three main time frames.

1. Primary-frequency controllers are locally installed in generation units and act immediately after a power imbalance resulting in a frequency deviation (locally measured). Droop regulators usually compose these controllers. The amount of the primary-control reserve ($P_{rp}$ in FIG. 1) represents the maximum amount of power available in the interconnected network after a frequency imbalance. This concept can be applied to a single generation unit or to the whole system.

2. Secondary-frequency controllers are, in general, centralized for each area that composes the interconnected power system and are responsible for compensating the frequency deviation from the rated value after the primary control intervention. The time-frame of the secondary-frequency control ranges from a few tens of second to a few minutes. In an area of the interconnected network, the secondary-control reserve ($P_{rs}$ in FIG. 1) represents the power responsible for bringing the frequency back to its rated value (i.e. 50 or 60 Hz).

3. The power that can be connected, automatically or manually, in order to provide an adequate secondary control reserve, belongs to the tertiary-frequency control and is known as the tertiary control reserve ($P_{rt}$ in FIG. 1). This reserve must be used in such a way that it will contribute to the restoration of the secondary control reserve when required. In general, we have that $P_{rp} \geq P_{rs} \geq P_{rt}$.

There are essentially two main drawbacks to this control philosophy: first, there is a monotonous-increasing dependency between the primary/secondary frequency-control reserves, and the errors associated with the forecasts of load absorption and production of renewables. Second, the definition of the primary/secondary frequency-control reserves are centralized; hence, distributed control mechanisms cannot be easily implemented.

The continuous increase of the connection of renewables, together with the planned penetration of demand-response mechanisms, is expected to have a large impact on this control philosophy. This will require increasing reserve scheduling in order to keep safe margins and maintain the grid vulnerability at acceptable levels (e.g., [Papadogiannis and Hatziargyriou, 2004]). An example of such a principle is described in [ENTSO-E, 2004] where the recommended secondary-frequency reserve is expressed by the following empiric relation:

$$P_{rs} = \sqrt{aL_{max}+b^2}-b \quad \text{(a.1.1)}$$

where $L_{max}$ is the maximum anticipated load of a specific area of the interconnected power system and a, b are empirical coefficients.

Such an approach it is not scalable in the sense that it was conceived for interconnected power systems where the generation units are limited in number, large in size and centrally controlled. Furthermore, it does not support a distributed approach to the energy-balance problem, where the energy balance is sometimes required at local levels (for example in emergency scenarios, or as a general objective of design for robustness).

Voltage Control—

This is one of the essential elements for the correct operation of power systems. Indeed, the secure operation of the electrical grid associated with the operational voltage limits of the equipment requires maintaining the voltage deviations within predetermined limits (e.g. [ENTSO-E, 2012]).

Such a control is realized at various levels and with different strategies that essentially control reactive-power injections. However, network voltages fluctuate as a function of various quantities such as the local and overall network load, generation schedule, power system topology changes and contingencies (e.g. tripping of generation units and/or lines). The typical approach for voltage-control divides the control actions as a function of their dynamics and as a function of their area of influence. In particular, the traditional distinction is the following.

1. Primary voltage-control is implemented by regulators of generation units. They initiate a rapid change of the generators' excitation when a variation in voltage across the generator terminals is detected. Other devices (e.g. static Var-compensators—SVCs) could be involved in such a control action.
2. Secondary voltage-control uses the voltage measured in a given node of a specific area usually chosen by the network operator as the most representative one. The secondary voltage control coordinates the action of multiple generators and other devices (such as SVC).
3. The tertiary voltage-control involves a process of optimization in order to adjust the settings of devices that influence the power flows. This control maintains a certain reserve in the controllers by sharing the resources (essentially the reactive power) that influence the voltage.

The major advantage of such an approach is that it allows for a decoupling of the controllers as a function of their area of influence. However, it is not scalable because, similarly to the frequency control, it was conceived for interconnected power systems, where the control resources are limited in number, large in size and centrally controlled (at the tertiary level). As a consequence, the adaptation of such a control approach to a context with a large penetration of dispersed and non-dispatchable generation is non-trivial.

This motivates us to propose a radically different approach, based on the direct control of power flows. With the inventive method described herein, scalability and complexity issues are radically addressed. The same method is able to control power systems of any size from micro-grids to bulk transmission networks.

The Grand Challenge of Direct Control of Absorbed/Injected Powers

The basic control mechanisms of an interconnected power system rely on the principle of the substantial separation between voltage and frequency controls. In particular, the equilibrium, stated by the well-known power-flow equations expressed in the implicit form by (a.2.1), is determined by assuming the presence of a non-null number of voltage sources in the grid. Such an assumption has two effects: The first is to implicitly fix the voltage of the network close to a desired value (i.e. the rated voltage); the second is to control the power balance of the system by means of a different variable that is the frequency of the various sources:

$$f_P^i(x, u) = P^i - V^i \sum_{h=1}^{N} V^h [G^{ih}\cos(\delta^i - \delta^h) + B^{ih}\sin(\delta^i - \delta^h)] = 0 \quad (a.2.1)$$

$$f_Q^i(x, u) = Q^i - V^i \sum_{h=1}^{N} V^h [G^{ih}\sin(\delta^i - \delta^h) - B^{ih}\cos(\delta^i - \delta^h)] = 0$$

where: x is the state array $x=[\delta^1, \ldots, \delta^N, V^1, \ldots, V^N]^T$ composed by the angles and the modules of the phase-to-ground nodal voltages of an N-bus grid; u is the array representing the nodal power injections $u=[P^1, \ldots, P^N, Q^1, \ldots, Q^N]^T$. Here $P^i$ and $Q^i$, $i=1, \ldots N$, represent the active and reactive power injection (produced by generation systems, absorbed by loads or exchanged by storage systems at $i^{th}$ network bus respectively), and $G^{ih}$, $B^{ih}$ are the real and imaginary parts of the $i^{th}$ element of the electrical grid admittance matrix.

If we formulate the equilibrium of the grid in terms of purely power injections, there is always the need to assess adequate reserves that guarantee the power balance (both active and reactive) of the system. In agreement with this methodology, the European Network Transmission Systems Operator (ENTSO-E) attempts to extend to distribution networks the so-called network codes that set up a common framework for network connection agreements between network operators and demand-facility owners or distribution-network operators [ENTSO-E, 2012]. This specific network code forces the distribution networks to provide the same frequency and voltage support by resources (i.e., power plants) directly connected to transmission networks. Such an approach, however, has many drawbacks in systems characterized by dominant non-dispatchable renewable energy resources where, to balance the power, the non-desirable use of traditional power plants (usually gas-fired turbines) is necessary (e.g. [Troy et al, 2012], [IEA, 2004]). In contrast, if it is possible to expose to a grid controller the state of each energy source (i.e., sources, storage systems and loads) in a scalable way, then it is possible to always find a stable system equilibrium point with little or no additional reserve. However, directly controlling every resource is clearly too complex when the number of systems gets large, as is the case with distributed generation, and thus seems to be unfeasible. This is the grand challenge we propose to tackle, with a new method that will enable the direct control of power-flows while being scalable and applicable to systems of any size.

Aims of the Invention

One objective of the invention is to define a method for direct and explicit control of power-flows by using a fully-composable method inspired by advances in computer science and Internet research.

Within the framework of modern power networks composed of distributed and centralized energy resources, an aim of the invention is to enable resources to direct communicate with each other and with subsystem that compose a given power system, in order to define real-time setpoints for all the distributed and centralized resources, such that the entire system is scalable and robust. To this end we propose the following objectives:

we define an abstract framework that applies to electrical subsystems and specifies their capabilities, expected behavior and a simplified view of their internal state. A subsystem is modelled as a utility maximiser under constraints; the constraints are represented as envelopes on sets of trajectories in the (P, Q) plane, together with a set of virtual costs. The existence of a common abstract framework is an essential step for scalability and composability. It was applied, for example, to the control of very large and heterogeneous communication networks in [Davie et al, 2002];

agents are responsible for subsystems and communicate with other agents by using a simple, yet powerful, protocol. The speed of convergence to a feasible solution of the control problem needs to be compatible with the fastest dynamic associated with power system stability or quality of supply. The abstract framework and the protocol contain time references and therefore it will be possible to combine a timing analysis of the communication system with the information provided by the protocol. Our method can be used in conjunction with formal validation tools such as Uppaal [Larsen et al, 1997; Woodcock, 2009] or BIP [Basu et al, 2006] and designs systems that can then be proved to be correct by construction;

the abstract framework is recursive, i.e., it is possible to compose a set of interconnected elements in a simple entity that responds to protocol messages. We will compute mathematically proven rules for the composition. For example, a local grid with several generation sources, storage facilities and loads can be viewed by the rest of the grid as a single entity/agent that can handle real-time control and reservation messages. Thus, systems of any size and complexity can be aggregated and handled in a scalable way; and as illustrated in the above sections, the current control philosophies of power systems for frequency and voltage are characterized by a structure that does not allow for their scalability. With the shift of the majority of the electricity production from centralized to decentralized systems, such an approach will no longer be capable of guaranteeing the secure operation of the power grids. In this respect, the proposed voltage and frequency controls will be coupled together by an inherent fully scalable composable language.

Expected Impact

The present invention is expected to cause a radical change in the control philosophies of the whole infrastructure of electrical power systems.

First, this will have an impact on this industry similar to the effect that the introduction of TCP/IP had on the telecom industry; it moved away from a complex and centralized architecture inherited from the analog world to a simpler and distributed one built on digital concepts. Control solutions will be simpler, based on re-usable and proven building blocks, and more robust. This will enable a wide-scale adoption of intelligence in all elements of the electrical grids, from large transmission networks to micro-grids.

Second, this will have a large number of societal benefits:
1. decarbonate the electrical generation systems by maximising the integration of renewables and minimising the non-renewable power plants needed to guarantee adequate reserve margins;
2. minimise the construction of the new electrical lines required by the continuous reinforcement of power systems;
3. enable active customers to have unlimited access to the electrical grid;
4. minimise the costs associated with a deep electrical infrastructure change;
5. minimise the costs associated with large-scale blackouts;
6. support local energy balance and thus reduce political disputes between regions or countries.

Third, and technically, it will make possible the following basic functionalities. For power systems in normal operating conditions:
1. inherent distributed control of renewables by taking advantage of the scalability property of the proposed approach;
2. seamless control of interconnected grids;
3. inherent control of distributed generation by means of the encapsulation of their state inside the state of the network to which they are connected;
4. equal control architecture for AC and DC grids;
5. inherent power flow control mechanisms in AC grids;
6. Creation of local energy balance that will facilitate the creation of local energy markets with real-time exchanges.

For power systems in emergency operating conditions:
1. creation of local islands of scalable size: the inventive approach will extend the concept of power systems "defence plans" to a fully scalable level where even local microgrids have the property of being islanded;
2. Smooth degradation of the power system state in case of major disturbances, thus avoiding the propagation of large blackouts.

Additional State of the Art

Several factors promote the development of the so-called smart grids concept: increased customer participation, policies aimed at encouraging lower carbon generation, large integration of renewables into electrical grids, ageing assets of the electrical infrastructure and progress in technology including information and communication technology. These factors suggest two possible models for the future network development: (i) the supergrid model composed of continental/intercontinental networks for bulk transmission, enabling networks to share centralized renewable power generation by interconnecting various countries; and (ii) the cell model where small networks for electricity distribution, including decentralized local power generation, energy storage and active customer participation, are intelligently managed so that they are operated as independent cells capable of providing different services to each other and of being operated as islands [Hatziargyriou et al, 2011]. It is likely that both models will emerge. As a consequence of this evolution, electrical systems will need to become more dynamic and adaptive, thus more complex. The current operation of electrical grids is mainly centralized and might not scale to support such an increased complexity in a robust way [*IEEE Std.* 1547.2, 2008].

A way to overcome this limitation devices is related to the appearance of flexible AC transmission systems (FACTS) devices that permit some level of direct power-flow control in electrical transmission networks (e.g. [Gotham and Heydt, 1998]) by enhancing the usable capacity of existing transmission lines and thus increasing the whole system loadability [Griffin et al, 1996], [Galiana et al, 1996]. However, as discussed in [Gerbex et al, 2001], the installation of FACTS devices is also bounded in view of the physical constraints of line loadability. A similar approach dealing with the direct power-flow control in transmission networks refers to the deployment of the DC supergrids. They are composed of high-voltage DC (HVDC) networks, added as a top layer to the existing AC transmission infrastructure (e.g. [Gordon, 2006]). As discussed in [Van Hertem and Ghandhari, 2010], this approach also exhibits several technical limitations associated with the centralised control philosophies of the electrical grids.

Another attempt to solve this problem was made during the 1990s when the manufacturers of supervisory control and data acquisition (SCADA) for power systems started the progressive integration of the functionalities of the so-called energy management systems (EMSs). Typical examples refer to state estimation and contingency analysis in the SCADA of power plants and transmission networks. Such a tendency was also partially deployed in distribution networks towards the concept of the so-called distribution management systems (DMSs) [Singh et al, 1998]. DMSs essentially rely on a centralised approach, inherited from SCADAs used in large transmission networks. But the progressive introduction of distributed energy resources (DERs), particularly from renewables essentially connected to power distribution grids, makes this approach inadequate and calls for a complete redefinition of the control hierarchy of the whole infrastructure (e.g. [Jenkins et al, 2000] and [Northcote-Green et al, 2007]). The cell model requires that islanding operations be easy; such an operation is today delicate and risky (e.g. [Borghetti et al, 2011]); it is desirable to move from a centrally managed operation to a distributed one, with intelligent devices able to take the appropriate actions at the right instants.

In this context, the idea of distributed state estimation is introduced in [Xie et al, 2012]; it can be applied to transmission networks, where the inertia is compatible with the convergence time of the algorithm, but not to the real-time operation of distribution networks. Other distributed-control approaches use virtual costs (by means of "marginal prices") as a proxy for the state of internal resources [Palomar and Mung, 2006]; it is shown that frequency-control can be cast in this framework [Zhao et al, 2011].

Multi-agent-based control systems are proposed in the literature (e.g. [Rehtanz, 2003]) as a step towards the distribution of control. Our approach goes several steps beyond. First, we base our method on a unified, abstract representation of devices and subsystems, which is a central ingredient for simple design and correctness by construction. Second, our approach can be composed, i.e. entire subsystems can be abstracted in the same way as a simple device, which makes our approach fully scalable from low-voltage microgrids to large transmission networks including AC and DC systems. Third, we target real-time control (e.g primary frequency and voltage controls).

In a different setting, the concept of a generic node model was developed for Internet reservation services. In the integrated services framework and with the RSVP protocol [Le Boudec and Thiran, 2001, Section 2.2.3], the details of an Internet router are hidden by using a simple representation with a rate latency service curve. The representation can be composed, and an entire network can be summarized by using the same concept, which makes the approach scalable. This has served as an inspiration for the method we propose here, with large differences, however, due to the physics of electrical interconnected systems.

Methodology

The Inventive Global Architecture Illustrated on an Example

Figure 2:
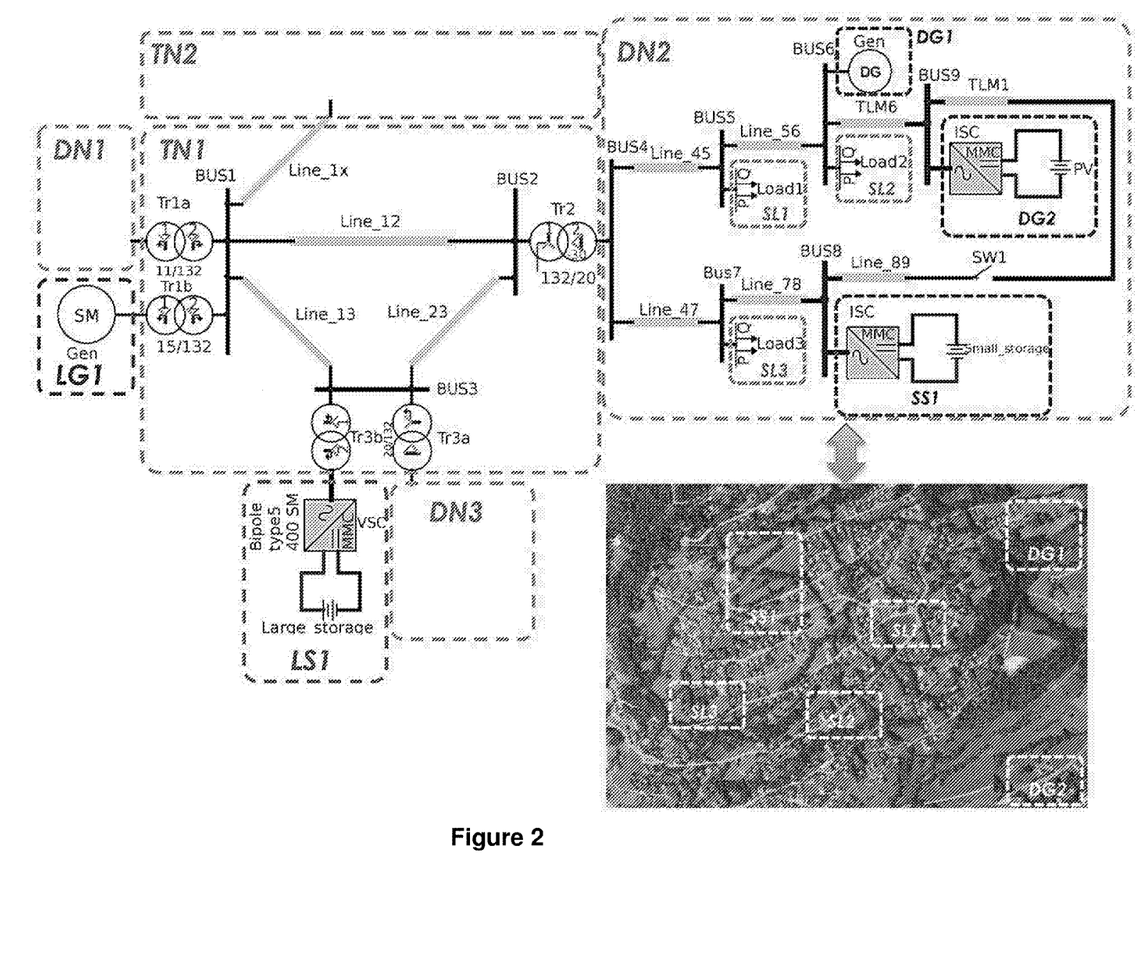
FIG. 2 contains an illustration of modern interconnected power systems configuration with active distribution networks.

In this section we introduce our global architecture using the real example of FIG. 2. A formal definition is presented in one of the following sections.

We rely on the current structure of power systems, essentially composed of a number of subnetworks interconnected at different voltage levels. Each sub-network is constituted of elements: networks themselves, loads, generators and storage devices. To illustrate, we use the example in FIG. 2 where a 132 kV sub-transmission network, with a meshed structure (TN1), interconnects a neighbour transmission network (TN2), a large generator (LG1), a large storage systems (LS1) and distribution networks (DN1, DN2, DN3) that have local generation and storage devices. The figure also shows a map with details of the distribution network DN2, where we can identify two reservoirs that are used as a pumping storage facility (SS1), a mini-hydro power plant (DG1) connected to a small reservoir fed by a river, a photovoltaic installation (DG2), as well as secondary substations that represent the local loads (SL1, SL2, SL3). The over-all power generation and storage capabilities inside DN2 could allow it to operate in islanded mode.

In our architecture, we assume that an element or entire system is associated with a real time agent—although there are several definitions of agents, the most accepted one is given in [Wooldridge and Jennings, 1995], where an agent is defined as an entity capable of autonomous actions in its environment in order to meet its design objectives—, who is in charge of estimating this element's state, making it available to other agents using an abstract representation, communicating with other agents and implementing power setpoints on this element. In the example, TN1 is capable of exchanging information with TN2, with the generator LG1 and the storage LS1, as well as with networks DN1, DN2, DN3 that represent loads or generation systems. Note that DN1, DN2 and DN3 can either inject or absorb power into/from TN1, as they have local resources similar to those of TN1, namely distributed generation (DG1, DG2), storage (SS1) and loads (SL1, SL2, SL3). The state of an element internal to some DNx is not directly visible to TN1, however each DNx advertises to TN1 an abstract view of its internal state that contains enough information for TN1 to compute decisions.

We consider two typical scenarios.

Scenario #1—A Network in Normal Operating Conditions with Driving Price Signals

Assume that the various DNx trade with each other and with LS1, LG1 and TN2. In a 'standard' market framework, each trader can negotiate packets of energy. Imbalances in the network are covered by a clearing market and by an adequate reserve scheduled inside TN1. If the LGx and DGx are renewables (solar or wind), their large volatility requires large reserves with the traditional approach (reserves are usually provided by dispatchable sources that might be fossil-fuel fired power plants or large storage systems). A direct consequence of such a control philosophy is to limit the penetration of renewable energy sources. In contrast, with our approach, we will perform a fine control of all absorbed/injected powers at all points in the system where some flexibility exists. For example, instead of blindly accepting all power injected by DNx and solving the imbalances by reserves, TN1 can directly control the power injections by all DNx. However, this immediately poses scalability and complexity problems: it is not feasible for a transmission network operator to directly control, for example, all local storages and distributed generators.

The present invention provides a solution to this problem. Consider, for example, the distribution network DN2, which, within a given time interval, trades with the other market participants. DN2 has the following additional objectives: (i) accept the power injections from DG1 and DG2 in order to maximize their profit, (ii) keep the network within the limits of an acceptable quality of service (i.e. bus voltages within a given interval, minimization of line congestions and network losses) and (iii) optimally set the reservoir level of SS1. The grid agent in charge of DN2 receives advertisements from its internal elements (i.e. DG1, DG2, SS1 or SLx) using a generic representation in terms of active power, reactive power and time, together with virtual costs and belief functions; detailed, specific information such as reservoir level is not needed. The belief functions DN2's agent is then able to compute in real time a region of optimal setpoints that strikes a balance between DN2's revenue from the market and objectives (i) to (iii). With no delay, and using the latest known information received from TN1, DN2's agent computes setpoints for its internal elements and sends them to the corresponding agents. In parallel, the region of setpoints is advertised to TN1's agent. Using the same methodology, the transmission network TN1 acquires a representation of the states of DNx, LGx and LSx, computes setpoints for the various DNx, which then apply them internally. Upon receiving setpoints from TN1, DN2's agent can recompute and send new setpoints to its internal elements.

Scenario #2—A Network in Emergency Operating Conditions

Assume that a fault inside TN1 produces a tripping of the storage system LG1, which in turn causes a large frequency transient. Assume that TN1 does not have enough generation reserve and therefore sends requests to all the DNx to reduce their loads in order to match the new generation capacity. With the present invention, this can be done by having TN1's grid agent send to each DNx a set of active and reactive setpoints $\tilde{P}_{DNx}^{TN1}, \tilde{Q}_{DNx}^{TN1}$. In order to compute such meaningful setpoints, the grid agent of TN1 needs some information about the internal state of the DNx and their constituents; in general, this is not scalable and requires too much communication overhead and too much processing complexity. In contrast, with our architecture, the grid agent of TN1 periodically and frequently receives from DNx status updates that contain an abstract view of DNx (as described in Section b.2.1) and uses them to solve an optimization problem and compute the setpoints such as $\tilde{P}_{DNx}^{TN1}, \tilde{Q}_{DNx}^{TN1}$.

Upon receiving the setpoint requests, each DNx computes its own internal setpoints. For example, DN2's grid agent computes the setpoints of the constituent systems DG1, DG2, SL1, SL2, and SS1 in order to minimize DN2's disutility, a function of the distances between the powers $\tilde{P}_{DN2}^{TN1}, Q_{DN2}^{TN1}$ and the objectives $\tilde{P}_{DN2}^{TN1}, \tilde{Q}_{DN2}^{TN1}$ set by TN1, of the internal constraints of DN2 and of the constraints of the constituent systems. With our architecture, the constraints of the constituent systems are available to DN2's agent by means of the same method used to export a model of DNx to TN1.

It is also worth noting that TN1 might also ask to DN1 to have $\tilde{P}_{DN2}^{TN1}(t) = \tilde{Q}_{DN2}^{TN1}(t) = 0$. In this case, DN2 has the right to execute a so-called islanding maneuver: this can be accomplished if DN2 has continuously driven its internal state according to the constraints advertised by its constituent systems. In this case, DN2 will assume the same role as TN1. In particular, in order to first reach a safe operating point, it will collect the states of its internal resources and compute its own optimal operating point. Subsequently, DN2 might decide to allow the trading of its internal resources by using the same methodology adopted by TN1. In case of adequate internal resource availability, DN2 can decide to stay in the islanding condition until TN1 requests to rebuild the network. The possibility of enabling the automatic islanded operation of DNx or TNx is far from the reality of modern power-systems emergency-operation. Our proposed approach is thus able to largely mitigate the effects of blackouts by driving the whole system towards a graceful degradation in small self-healing islands.

Elements of the Invention

An Abstract Method for Power and Voltage Control Agents

We use software agents, i.e., pieces of software that are able to speak for, and control, a set of electrical systems. An agent can be associated with a device (such as a generator, a storage system, or a large load, for example a building automation system), or an entire system including a grid and a number of devices. An agent can be implemented as a stand-alone processor, as a process on a control computer, or as an embedded system. Small systems such as appliances, boilers or small photovoltaic roofs do not need to have a specific agent. Instead, they can be controlled and represented by one single aggregating-group agent that uses a broadcast protocol such as GECN.

The Power and Voltage Control Protocol (PVCP)

In the present invention, agents communicate with each other by using a simple ADVERTIZE/REQUEST protocol, and using some simplified quantitative information about their capabilities and internal states.

Figure 3:
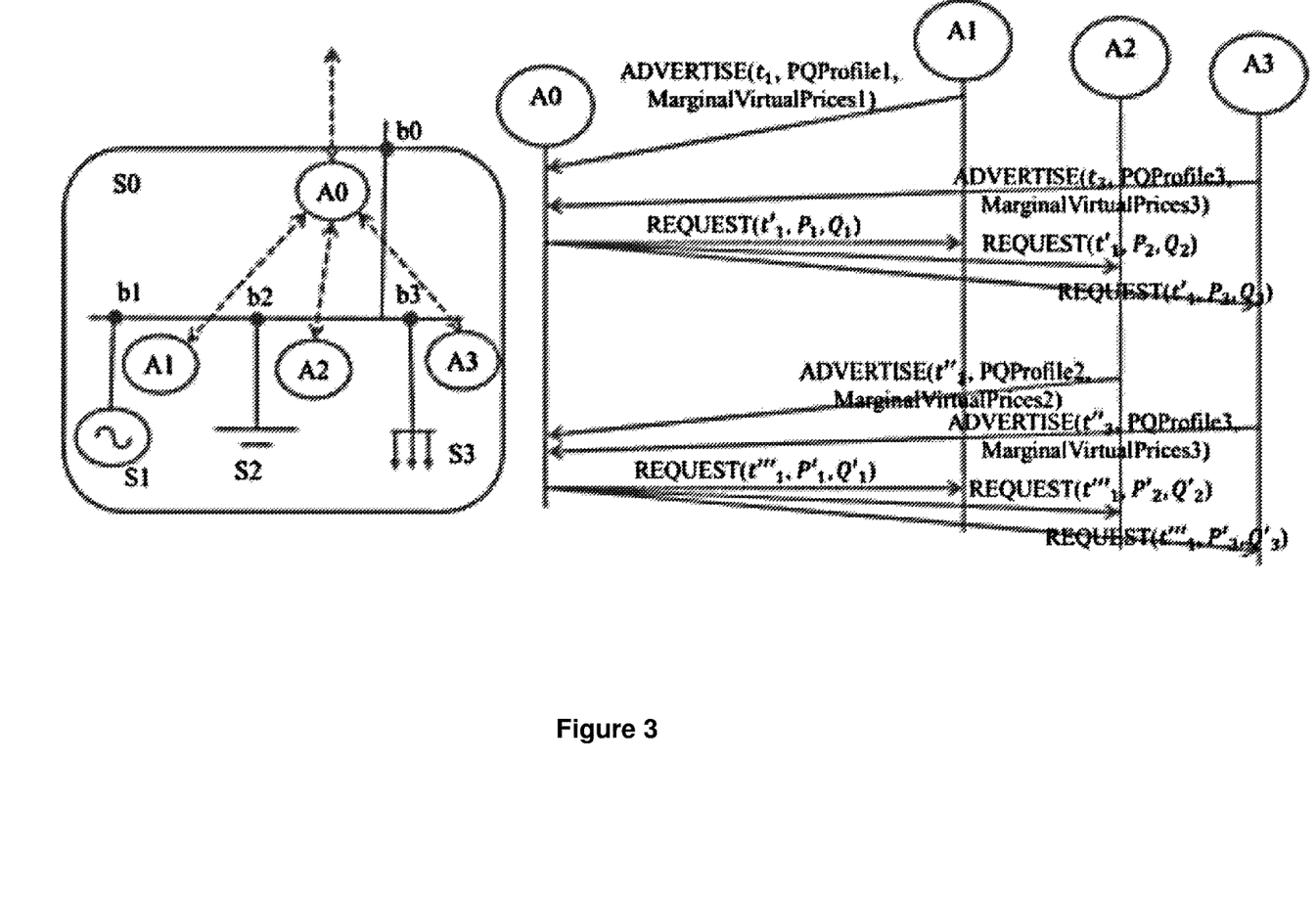
FIG. 3 illustrates a simple network and agents, showing protocol messages.

Consider the FIG. 3, a simplified view of the examples given in the previous section. A0 is the grid agent in charge of controlling an AC grid S0 that consists of an electrical network, a generator S1 connected at b1, a storage system S2 connected at b2 and a set of loads S3 connected at b3. Agent Ai is the agent in charge of the subsystem Si, i=1,2,3. Note that the agents in this description are logical entities, which may be implemented on devices collocated with the systems they represent, or somewhere else. For example, we imagine that the load agent A3 can be located on the same processor as the grid agent A0, whereas the generator and storage agents can be implemented on the control systems of these devices.

The agents communicate using a set of messages; a first set of messages, not described in detail here, is used to assign roles, namely leader or follower. The roles follow the hierarchy of distribution and transmission networks. In our example, agent A0 assumes the role of leader. A1, A2 and A3 periodically advertise an abstract view of their internal state (in the form of a "PQt profile" and virtual costs). Agent A0 monitors and estimates the state of the internal grid and uses the information it has about A1 to A3 to compute operating points; if needed, this requires sending setpoint requests to A1, A2 and/or A3. The setpoints are computed taking into account the communication and processing delays.

On receiving the requests, A1 and A2 set, if possible, their operation according to the required setpoints and respond with a new advertisement, which also serves as a confirmation to A0 that the setpoints were accepted. The request message to Agent A3 can cause demand response to be exercised on the loads in S3. The process is repeated at short intervals and on demand, as A0 or any other agent sees the need for it. Note that messages are sent asynchronously and frequently enough for real-time constraints to be met; in particular, every agent is assumed to recompute its operating points when it receives new information. This event-level asynchronism, also called "soft state approach" [Raman and McCanne, 1999] is essential for system robustness.

The ADVERTIZE messages contain the following components:
1. a time reference, including a time stamp that indicates the time $t_0$ at which this message was generated. The time reference indicates the nature of the time base. For most systems, this is the universal time, but we envision that isolated grids use their own local time;
2. A PQt profile describes bounds for active and reactive power that this system can inject or absorb (negative power means absorption), over a time horizon $\Delta t$ starting from time $t_0$. Formally, a PQt profile has one or several components, each one being a subset of the P×Q×t space, where P stands for active power, Q for reactive power and t for time. (for AC systems; for DC systems, the Q component is 0 and the P component represents DC power). A PQt profile component can be deterministic, in which case the bounds are hard, or probabilistic, in which case the PQt profile component can also contains confidence levels;
3. virtual costs contain information about how close the subsystem is to its operational constraints. The virtual costs are a function of both active power and reactive power. In the example above, the virtual costs contained in ADVERTIZE messages are used by the grid agent A0 to compute active and reactive power setpoints requested from the generator or from the storage system. In this example, the virtual costs are linear such as. $C_1(P_1, Q_1)=\lambda_1 P_1+\mu_1 Q_1$. When the state of charge of the storage system is close to 100%, the derivative of the virtual cost with respect to active power (i.e. here $\lambda$), advertised by the storage agent A2 is negative; thus A2 signals to the grid agent A0 that the storage system would prefer to be discharged (and vice-versa $\lambda$, it is positive when the state of charge is below its lower operating threshold). The virtual costs can depend on time.

4. belief functions specify the region of active (P) and reactive powers (Q) that this system can inject or absorb as a result of receiving a specific setpoint. Belief functions express the uncertainty about the operation of this system; they are used to guarantee that the global interconnected systems, or a subsystem of it, are always in a safe region of operation.

The REQUEST message contains a time stamp and the desired settings (active and reactive powers). How each agent implements the required setpoints is dependent on the nature of the system.

Decoupling of Control

Each agent makes decision based only on the information advertised to it, without having to know all internal details of the subsystems it interacts with. In the example above, the grid agent A0 solves the problem:

$$\text{Minimise } W(y(P_1,Q_1,\ldots,P_3,Q_3))+C_1(P_1,Q_1)+C_2(P_2,Q_2)+C_3(P_3,Q_3) \quad \text{(Eq. 1)}$$

over $$(P_1,Q_1,P_2,Q_2,P_3,Q_3) \in R$$

and subject to the constraints expressed in the PQt profiles for $(P_i, Q_i)$ advertized by Ai, for i=1,2,3

In the above, $P_1$, $Q_1$ are the active and reactive powers at a node b1 in the interconnected power system, $C_1(P_1, Q_1)$ is the virtual cost advertised by agent 1, and similarly with indices 2 and 3, y is the state of the grid and W is a penalty function, which maps the estimated state to a measure of the quality of service of the grid controlled by the agent.

The set R is the set of admissible setpoints derived from the belief functions. A setpoint $(P_1, Q_1, P_2, Q_2, P_3, Q_3)$ is said admissible if any $(P'_1, Q'_1, P'_2, Q'_2, P'_3, Q'_3)$ such that $(P'_1, Q'_1) \in BF_1$, $(P_1, Q_1)$, $(P'_2, Q'_2) \in BF_2(P_2, Q_2)$ and $(P'_3, Q'_3) \in BF_3(P_3, Q_3)$ leads to only safe electrical states of the grid.

Here $BF_1(P_1, Q_1)$ is the set of possible actual active and reactive powers that the first electrical system can inject or absorb when it receives the setpoints $(P_1, Q_1)$, and similarly with indices 2 and 3.

The use of region R and the belief functions ensures that the grid operates in a safe electrical state at all times.

The value of W is high when the quality of service is bad. For example, in the very simplified case where the sole purpose of A0 would be to control voltage at a reference point, we could take $$W = \left(\frac{V-1}{\alpha - |V-1|}\right)^2$$

for $|V-1|<\alpha$ where $$V = \frac{|E_0|}{|E|_{nom}}$$

is the relative voltage amplitude at the reference point and $\alpha$ is the tolerance margin.

Composition of Subsystems

A key aspect of our proposal is compositibility: subsystems can be aggregated and viewed by others as a single entity. In the example above, assume that the grid controlled by A0 is connected to the outside grid at a slack bus b0. The grid agent A0 can now represent its grid S0, including the local resources S1 to S3, to the outside. When doing so, A0 advertises an aggregated PQt profile, aggregated virtual costs and belief functions.

The aggregated PQt profile advertised by A0 represents bands of feasible values for active power $P_0$ and reactive power $Q_0$ at the interconnection point b0. They are computed by using power-flow equations given the PQt profiles of internal systems A1 to A3 and given the characteristics of the grid S0. It is possible to simplify the computation by making an approximation; in such a case, the approximation of the PQt profile must be a subset of the true set.

The aggregated virtual costs $C_0(P_0, Q_0)$ can be estimated as follows. For every feasible $(P_0, Q_0)$, A0 solves the optimization problem similar to (Eq. 1), with the additional constraint that the observed power at b0 is $(P_0, Q_0)$ and finds some optimal setpoints $(P_1, Q_1, P_2, Q_2, P_3, Q_3)$. The value of $C_0(P_0, Q_0)$ is then set to $W(P_1, Q_1, \ldots, P_3, Q_3)+C_1(P_1, Q_1)+C_2(P_2, Q_2)+C_3(P_3, Q_3)$.

The aggregated belief function $BF_0(P_0, Q_0)$ is computed similarly. First A0 solves the optimization problem similar to (Eq. 1), with the additional constraint that the observed power at b0 is $(P_0, Q_0)$ and finds some optimal setpoints $(P_1, Q_1, P_2, Q_2, P_3, Q_3)$; this is the same first step as for the computation of aggregated virtual cost. Second, the belief functions of A1, A2 and A3 are applied; the set of possible P,Q values observed at b0 is derived, using power flow equations. This set is the value of the belief function $BF_0(P_0, Q_0)$. It is possible to simplify the computation by making an approximation; in such a case, the approximation of the belief function must be a superset of the true set.

Thus, to the outside world, S0 appears as a single system with one PQt profile, one virtual cost and one belief function. This is the essential element of the invention: the same approach is used as different levels of aggregation, which makes the method scalable.

Note that there is no cascading of delay; the soft state approach allows one agent to apply new setpoints as soon as new information is received In heterogeneous systems the virtual costs and the underlying penalty functions might not all be defined using the same metric. In order to allow for a smooth interoperation of heterogeneous systems, we will explore the use of import policies, by means of which a system such as A0 would rescale the advertised virtual costs such as $C_1$ before solving the optimization problem (Eq. 1). Also note that virtual costs are only proxies for expressing constraints and are not real money (though they can be used for computing prices, but this is outside the discussion here).

Agents and their Interaction Towards Specific Signals

The role of agents, with respect to the power and voltage control protocol, is to (1) advertise the status of the element (device or entire subsystem) that it represents in PQt coordinates and with virtual costs and (2) implement PQ setpoints (as a result of receiving REQUEST messages, or under the agent's own initiative). We define two types of agents, namely: resources and grid agents.

Resource agents are associated with generation systems (both dispatchable and non-dispatchable), storage systems or loads. These agents have the role of converting into PQt profiles and virtual costs the internal status of each element. For example, for a storage system, the PQt profile indicates the power and energy constraints; the virtual costs reflect the state of charge. For a dispatchable generation system, the PQt profile is simply the generator's capability curves. Finally, for non-dispatchable energy sources and loads, agents are required to abstract the forecast states of these element in the PQt space and in virtual costs. Resource agents also control their devices as a response to REQUEST messages by using a local control law. For simple systems, a direct application of the setpoint is performed, as long as it is feasible. Other systems can control their powers only indirectly and require the definition of a control law.

The state of large groups of loads (e.g. multiple customers connected to the same medium-to-load voltage secondary substation) or distributed generation units (e.g. small-scale photovoltaic sources associated with active customers connected to the same medium-to-load voltage secondary substation) can be abstracted by using a single agent (load or generation type) that plays the role of aggregator. In order to infer its internal state, or impose a specific PQt setpoint, the aggregator uses a specific protocol to control its elements. For example, we can suppose that the aggregator uses a specific congestion signal (henceforth called grid explicit congestion notification—GECN). It is composed by a 16-bit signal sent over the power lines at a rate of one value per second. The signal is GECN=(A, R) where A and R are 8-bit signed integers in the range {−127, . . . , +128}. A positive A is used to signal active power congestion to all devices on the bus, and R is to signal reactive power congestion. A negative A or R is a signal to increase power consumption or reduce power generation. This signal is sensed by electrical systems (loads, generators, storage units) that react by using their local control laws. The GECN signal can be computed by the aggregator as a result of a local optimization problem, as in [Christakou et al, 2012].

Another type of aggregator concerns groups of electric vehicles. Here, the amount of power drawn (or injected) by every device is not small, and the aggregator might afford to communicate with each device individually, using the PVCP protocol. In this case, the aggregator uses the standard PVCP composition method defined in Work Package b.2.1 for computing the aggregated PQt profile and virtual costs. For controlling the electric vehicles, it may use a scheduling method as in [Neely et al, 2010].

Grid agents represent and control entire subsystems, including a grid. They are required to determine and control the status of the network in terms of secure operation margins (e.g. congestion margins) and quality of the supply (e.g. voltage variations). To satisfy these needs, starting from the knowledge of the real-time state of the network, grid agents are supposed to use a set of specific behaviour rules to manipulate the setpoints of the resource agents within their advertised PQt spaces. It is worth observing that the grid agents will be capable of dealing with both AC and DC grids. Indeed, similarly to resource agents, they will apply the same set of behaviour rules to manipulate the setpoints of their internal resources in spite of the fact that they have an AC or a DC power system.

REFERENCES

Arrillaga J., Bradley D., and Bodger P., *Power system harmonics*, J. Wiley and Sons, NY, 1985.

Anderson, D. F., and Kurtz T. G., "Continuous time Markov chain models for chemical reaction networks" Design and Analysis of Biomolecular Circuits: *Engineering Approaches to Systems and Synthetic Biology* (2011): 3-42.

Basu A., Bozga M., and Sifakis J., "Modeling heterogeneous real-time components in BIP", Proc. of the 4$^{th}$ IEEE International Conference on. Software Engineering and Formal Methods, SEFM 2006.

Benaim M., and Le Boudec J.-Y., "A class of mean field interaction models for computer and communication systems". *Performance Evaluation* 65.11, 2008, pp. 823-838.

Borghetti A., Nucci C. A., Paolone M., Ciappi G., Solari A., "Synchronized Phasors Monitoring During the Islanding Maneuver of an Active Distribution Network", *IEEE Trans. on Smart Grid*, vol. 2, issue: 1, March, 2011, pp: 82-91.

Christakou K., Tomozei D.-C., Le Boudec J.-Y., and Paolone M., "GECN: Primary Voltage Control for Active Distribution Networks via Real-Time Demand-Response", in press on IEEE Trans. on Smart Grids, 2014.

Christakou K., Le Boudec J.-Y, Paolone M., and Tomozei D. C., "Efficient Computation of Sensitivity Coefficients of Node Voltages and Line Currents in Unbalanced Radial Electrical Distribution Networks", *IEEE Trans. on Smart Grid*, to appear, 2013.

Davie B., Charny A., Bennet J. C. R., Benson K., Le Boudec J. Y., Courtney, W., Stiliadis, D. "An expedited forwarding PHB (per-hop behavior)", *Internet RFC* 3246, 2002.

European Network of Transmission System Operators for Electricity (ENTSO-E), *UCTE Operation Handbook*, v. 2.5, June, 2004.

European Network of Transmission System Operators for Electricity (ENTSO-E), *Draft Network Code on Demand Connection*, Dec. 5, 2012.

Galiana F. D., Almeida K., Toussaint M., Griffin J., and Atanackovic D., "Assessment and control of the impact of FACTS devices on power system performance", *IEEE Trans. on Power Systems*, vol. 11, no. 4, November 1996, pp. 1931-1936.

Gast, N., Gaujal B., and Le Boudec J-Y., "Mean field for Markov decision processes: from discrete to continuous optimization", *IEEE Trans. on Automatic Control, vol. 57*, issue: 9, September 2012, pp. 2266-2280.

Gerbex S., Cherkaoui R., and Germond A. J., "Optimal Location of Multi-Type FACTS Devices in a Power System by Means of Genetic Algorithms", *IEEE Trans. on Power Systems*, vol. 16, issue: 3, August 2001, pp. 537-544.

Gordon S., "Supergrid to the rescue," *Power Engineer*, vol. 20, no. 5, pp. 30-33, October-November 2006.

Gotham D. J. and Heydt G. T., "Power flow control and power flow studies for systems with FACTS devices", *IEEE Trans. on Power Systems*, vol. 13, issue: 1, February 1998, pp. 60-65.

Griffin J., Atanackovic D., and Galiana F. D., "A study of the impact of FACTS on the secure-economic operation of power systems," Proc. of the 12$^{th}$ Power Systems Computation Conference, Dresden, August 1996, pp: 537-544.

Hatziargyriou, N. et al., CIGRE WG Network of the Future, "Electricity Supply Systems of the Future", *Electra*, vol. 256, June 2011, pp. 42-49.

IEA, *World Energy Outlook*, 2004.

IEC 61588, *Precision Time Protocol (PTP)*, version 2, International Electro-technical Commission, Geneva, 2008.

IEEE Std 1547.2, *IEEE Application Guide for IEEE Std 1547*, IEEE Standard for Interconnecting Distributed Resources with Electric Power Systems, 2008.

Jenkins N., Allan R., Crossley P., Kirschen D., and Strbac G., *Embedded Generation*, IEE, London, U.K., 2000.

Keshav, S., and Rosenberg C., "Direct adaptive control of electricity demand", Technical Report CS-2010-17, University of Waterloo, 2010.

Larsen, K. G., Pettersson P., and Wang Yi. "UPPAAL in a Nutshell,", *International Journal on Software Tools for Technology Transfer* (STTT) 1.1, 1997, pp. 134-152.

Le Boudec J.-Y., and Thiran P., *Network calculus: a theory of deterministic queuing systems for the Internet*, vol. 2050, Springer, 2001.

Le Boudec J.-Y., and Tomozei D.-C. "A demand-response calculus with perfect batteries." Measurement, Modelling, and Evaluation of Computing Systems and Dependability and Fault Tolerance, 2012, pp. 273-287.

MacKay D., *Sustainable Energy-without the hot air*, UIT Cambridge, 2008.

Neely M. J., Tehrani A. S., and Dimakis A. G. "Efficient Algorithms for Renewable Energy Allocation to Delay-Tolerant Consumers", Proc. of the 1$^{st}$ IEEE International Conference on Smart Grid Communications (SmartGridComm), 2010, pp. 549-554.

Northcote-Green J. and Wilson R., *Control and Automation of Electric Power Distribution Systems*, Boca Raton, Fla.: Taylor & Francis, 2007.

Palomar D. P., and Mung Chiang. "A tutorial on decomposition methods for network utility maximization", *IEEE Journal on Selected Areas in Communications*, vol. 24, issue: 8, 2006, pp. 1439-1451.

Papadogiannis K. A., and Hatziargyriou N. D., "Optimal allocation of primary reserve services in energy markets", *IEEE Trans. on Power Systems, vol.* 19, issue: 1, 2004, pp. 652-659.

Rehtanz C., *Autonomous Systems and Intelligent Agents in Power System Control and Operation*, Springer, 2003.

Raman, S. and McCanne, S., "Model, analysis, and protocol framework for soft state-based communication", *ACM SIGCOMM Computer Communication Review, vol.* 29, 1999, pp. 15-25.

Singh N., Kliokys E., Feldmann H., Kiissel R., Chrustowski R., and Jaborowicz C., "Power System Modelling and Analysis in a Mixed Energy Management and Distribution Management System", *IEEE Trans. on Power Systems.*, vol. 13, issue: 3, August 1998, pp. 1143-1149.

Thiele L., Chakraborty S., and Naedele M., "Real-time calculus for scheduling hard real-time systems", Proc. of the 2000 IEEE International Symposium on Circuits and Systems, ISCAS, Geneva, Switzerland, vol. 4., pp. 101-104.

Troy N., Flynn D., OMalley M., "Multi-Mode Operation of Combined-Cycle Gas Turbines With Increasing Wind Penetration", *IEEE Trans. on Power Systems*, vol. 27, issue: 1, February 2012, pp. 484-492.

Van Hertem D. and Ghandhari M., "Multi-terminal VSC HVDC for the European Supergrid: Obstacles," *Renewable and Sustainable Energy Reviews*, vol. 14, no. 9, 2010, pp. 3156-3163.

Wooldridge M. and Jennings N. "Intelligent agents: theory and practice", *The Knowledge Engineering Review*, vol. 10, pp. 115-152, 1995

Woodcock J., Larsen P. G., Bicarregui J., Fitzgerald J., "Formal methods: Practice and experience", *ACM Computing Surveys* (CSUR), vol. 41.4, 2009, pp. 19-1, 19-36.

Xie, L., Dae-Hyun Choi, Kar, S., Poor, H. V., "Fully Distributed State Estimation for Wide-Area Monitoring Systems", *IEEE Trans. on Smart Grids*, vol. 3. issue: 3, September 2012, pp. 1154-1169.

Zhao, C., Topcu, U. and Low, S. H. "Fast load control with stochastic frequency measurement", California Institute of Technology, Pasadena, USA, 2011.

The invention claimed is:

1. A method for an explicit power flow control in an interconnected power system, the method performed on a system including a computer, a plurality of interconnected electrical subsystems, and a plurality of agents, each agent associated to a corresponding interconnected electrical subsystem, the method comprising steps of:

defining the plurality of agents, each of the plurality of agents is operated on the computer and configured to take autonomous action on an associated interconnected electrical subsystem front the plurality of interconnected electrical subsystems to meet a determined design objective;

and defining a framework operated on the computer, the framework related to the plurality of interconnected electrical subsystems to specify an internal state and an expected behavior of each one of the interconnected electrical subsystems to provide a common system of coordinates, wherein the step of defining the framework includes the steps of, using, for each one of the plurality of interconnected electrical subsystems, an agent associated to one of the interconnected electric subsystems, for representing the framework as an envelope of a set of trajectories of the associated interconnected electrical subsystem in the common system of coordinates, the set of trajectories including a power-reactive power-time (PQt) profile and a set of virtual costs and belief functions;

and using, for each one of the plurality of interconnected electrical subsystems, the agent associated with the interconnected electric subsystems, for communicating an internal state and expected behavior of the interconnected electrical subsystem by using a protocol, wherein the PQt profile describes bounds for an active power (P) and a reactive power (Q) that the interconnected electrical subsystem is capable of injecting or absorbing over a time horizon At starting at a time to, the virtual costs include information about operational constraints applied to the interconnected electrical subsystem, as a function of the active power (P) and the reactive power (Q), and the belief functions include bounds for the active power (P) and the reactive power (Q) that the interconnected electrical subsystem is capable of injecting or absorbing when instructed to operate at a predetermined active and reactive power setpoint;

and wherein each agent is configured to solve an optimization problem that minimizes an objective function, wherein the objective function is given by the following problem:

minimize $$W(y(P_1,Q_1,\ldots,P_3,Q_3))+C_1(P_1,Q_1)+C_2(P_2,Q_2)+C_3(P_3,Q_3)$$

over $(P_1, Q_1, P_2, Q_2, P_3, Q_3) \in R$ wherein $(P_n, Q_n)$ represent active and reactive powers at a node $b_n$ with n being the number of interconnected electrical subsystems in the interconnected power system, $C_n$ $(P_n, Q_n)$ represents a virtual cost calculated by agent n, and y represents a state of a grid of the interconnected power system, W is a penalty function which maps an estimated state to a measure of a quality of service of the grid controlled by the agent, and R represents a set of admissible setpoints derived from the belief functions.

2. The method of claim 1, wherein the objective function includes a measure of a quality of an electrical service and a sum of virtual costs calculated by the plurality of agents subject to constraints expressed by the belief functions, to ensure that the interconnected power system is always in a safe state.

3. The method of claim 1, wherein a group of interconnected electrical subsystems is aggregated and viewed by other interconnected electrical systems as a single entity using a framework specific to the group.

4. The method of claim 1, wherein the interconnected power system includes at least one of alternative current (AC) interconnected electrical subsystems and direct current (DC) interconnected electrical subsystems.

5. The method of claim 1, wherein a setpoint $(P_1, Q_1, P_2, Q_2, P_3, Q_3)$ is admissible if any $(P'_1, Q'_1, P'_2, Q'_2, P'_3, Q'_3)$ such that $(P'_1, Q'_1) \in BF_1(P_1, Q_1)$, $(P'_2, Q'_2) \in BF_2 (P_2, Q_2)$, and $(P'_3, Q'_3) \in BF_3 (P_3, Q_3)$ leads to safe electrical states of the grid, and $BF_n (P_n, Q_n)$ is a set of possible actual active and reactive powers that an interconnected electrical subsystem n is capable of injecting or absorbing when the interconnected electrical subsystem receives the setpoints $(P_n, Q)$.

* * * * *